(12) United States Patent
Elliott et al.

(10) Patent No.: US 10,131,403 B2
(45) Date of Patent: Nov. 20, 2018

(54) DOUBLE MOTOR POWER UNIT AND PROCEDURE FOR MOUNTING THE UNIT ONTO BICYCLE FRAME

(71) Applicant: S.C.P. TYPHOON, Monaco (MC)

(72) Inventors: William Bond Elliott, Panama (PA); Istvan Varjas, Pécs (HU)

(73) Assignee: S.C.P. TYPHOON, Monaco (MC)

( * ) Notice: Subject to any disclaimer, the term of this patent is extended or adjusted under 35 U.S.C. 154(b) by 0 days.

(21) Appl. No.: 15/550,032

(22) PCT Filed: Feb. 10, 2015

(86) PCT No.: PCT/IB2015/050995
§ 371 (c)(1),
(2) Date: Aug. 10, 2017

(87) PCT Pub. No.: WO2016/128789
PCT Pub. Date: Aug. 18, 2016

(65) Prior Publication Data
US 2018/0009504 A1    Jan. 11, 2018

(51) Int. Cl.
*B62M 6/55*            (2010.01)
*B62M 11/14*           (2006.01)
(Continued)

(52) U.S. Cl.
CPC .............. *B62M 6/55* (2013.01); *B62K 19/30* (2013.01); *B62M 6/90* (2013.01); *B62M 11/145* (2013.01); *F16D 1/116* (2013.01); *H05K 999/99* (2013.01)

(58) Field of Classification Search
CPC ........ B62M 6/55; B62M 6/90; B62M 11/145; B62K 19/30
(Continued)

(56) References Cited

U.S. PATENT DOCUMENTS 3,921,741 A * 11/1975 Garfinkle ................. B62M 6/45
                                                180/206.2
5,845,727 A * 12/1998 Miyazawa ............... B62M 6/55
                                                180/206.4
(Continued)

FOREIGN PATENT DOCUMENTS

EP           1193171 B1       7/2008
EP           1878650 B1      12/2008
(Continued)

*Primary Examiner* — Jacob D Knutson
(74) *Attorney, Agent, or Firm* — Idea Intellectual Limited; Margaret A. Burke; Sam T. Yip

(57) ABSTRACT

The invention is a double motor power unit, suitably for being mounted onto a bicycle frame, which is fitted with at least two motors (7), at least one power supply (13), bearings (8), crank shaft pinion gearhead (11), at least one propulsor pinion gearhead (10) for each motor, at least one planetary gearbox (15) for each motor, and at least one central processor unit (12). It is characterized in that the propulsor pinion gearheads (10) are connected to pinions with dynamometric system (19), having an at least approximately identical axis, and to planetary gearboxes (15) through the pinions, while the inside of the bearings (8) is in fixed connection with the crank shaft (9) and the outside of the bearing (8) is in fixed connection with the crank shaft pinion gearhead (11). The invention is also the procedure for placing the power unit according to claim suitably into a bicycle frame.

5 Claims, 4 Drawing Sheets

(51) Int. Cl.
  *B62K 19/30* (2006.01)
  *F16D 1/116* (2006.01)
  *B62M 6/90* (2010.01)

(58) Field of Classification Search
  USPC .......................................................... 180/220
  See application file for complete search history.

(56) References Cited

U.S. PATENT DOCUMENTS

| | | | | |
|---|---|---|---|---|
| 5,865,267 | A * | 2/1999 | Mayer | B62M 6/60 180/206.5 |
| 6,230,586 | B1 * | 5/2001 | Chang | B62M 6/55 180/206.4 |
| 6,554,730 | B1 * | 4/2003 | Sakai | B62M 6/55 180/206.4 |
| 7,284,631 | B2 * | 10/2007 | Rizzetto | B62M 6/55 180/206.4 |
| 9,120,532 | B2 * | 9/2015 | Huang | B62M 6/55 |
| 9,616,969 | B2 * | 4/2017 | MacMartin | B62M 6/55 |
| 2013/0184112 | A1 * | 7/2013 | Choi | F16H 37/065 475/5 |
| 2014/0345421 | A1 * | 11/2014 | Gingl | B62M 6/55 74/661 |
| 2015/0300472 | A1 * | 10/2015 | Park | B60W 10/04 475/8 |
| 2017/0137087 | A1 * | 5/2017 | Watarai | B62M 6/45 |
| 2017/0183057 | A1 * | 6/2017 | Gibbings | B62M 3/003 |

FOREIGN PATENT DOCUMENTS

| | | |
|---|---|---|
| EP | 2228293 A2 | 9/2010 |
| EP | 2502819 A1 | 9/2012 |
| WO | 2005009831 A2 | 2/2005 |
| WO | 2011021164 A2 | 2/2011 |
| WO | 2011146851 A1 | 11/2011 |
| WO | 2013067565 A1 | 5/2013 |

\* cited by examiner

DOUBLE MOTOR POWER UNIT AND PROCEDURE FOR MOUNTING THE UNIT ONTO BICYCLE FRAME

CROSS-REFERENCE TO RELATED APPLICATION

This application is a national phase entry of PCT/IB2015/050995 filed on Feb. 10, 2015; the disclosure of which is incorporated herein by reference in its entirety.

FIELD OF INVENTION

The subject of the invention is a double motor power unit, suitably for being mounted onto a bicycle frame, which is fitted with at least two motors, at least one power supply, bearings, crank shaft pinion gearhead, at least one propulsor pinion gearhead for each motor, at least one planetary gearbox for each motor, and at least one central processor unit, where the crank shaft pinion gearhead is connected to a crank shaft through bearings, and the central processor unit is in wired or wireless connection with at least one motor through a switch. The subject of the invention also includes the procedure for mounting the unit suitably onto a bicycle frame.

BACKGROUND OF INVENTION

The state of the art includes the following known solutions.

European publication document No. EP2502819 A1 and European patent document No. EP 1878650 B1 describes a product called *Vivax* Assist. The auxiliary engine is not visible and is mounted in a top-down direction by the seat. The engine is mounted into the seat tube in a top-down direction and is fit for being installed in various frames. Similarly to the present invention, the engine supports treadling after pressing a button on the handlebar. The performance of the approximately 1.8 kg heavy device is 200 Watt. The disadvantages of the engine include that the engine keeps the pedals running in case of, for example, an accident, and that the engine might even break the axis if it cannot keep turning due to stuck pedals. Another disadvantage is that the pinion is always rotated, when the engine is not running, thereby being subject to amortization and providing resistance.

Other known solutions include auxiliary motors mounted into the lower, tilted frame tube. Not all existing frames are fit for being used with such solutions, and the bicycles are also heavier than optimal. A significant disadvantage is that such electric bicycles can be purchased and used only as pre-fitted units and they are unfit for being mounted individually and using unique settings.

European patent document No. EP 1193171 B1 and international patent documents No. WO2005009831 A2 and WO2011146851 A1 describe electric bicycles with auxiliary engine.

European patent document No. EP2228293 A2 describes an engine for easy bicycles that drives the axis of the bicycle.

International publication document No. WO2011021164 A2 describes devices for electric bicycles. The emphasis is placed by this invention onto the technical details of the wheel. International publication document No. WO2013067565 A1 describes a more traditional Pedelec electric bicycle, which is heavier and is fitted with an external auxiliary engine.

A common disadvantage of solutions belonging to the state of art is that they are significantly heavier than 15 to 20 kg, so they are not suitable for sport activities or heavy usage. Another disadvantage is that the user needs to keep the device switched on when riding uphill. Yet another disadvantage is that the design of such devices may cause the back wheel spin freely on wet road, thereby possibly putting the user in danger. It is also disadvantageous that they cannot deliver the performance that is achievable with this solution, even with a significant extra weight. The state of the art does not include any bicycle with more than one hidden motors that could deliver extra performance of this level, and also working quietly and involving such insignificant extra weight.

SUMMARY OF INVENTION

The purpose of the invention is to eliminate the shortfalls of known solutions and to implement a device that can help riding a bicycle with great performance and without being detected by outsiders and can do so in a safe manner by using a pinion with dynamometric system to prevent the axis from breaking and a freely rotating bearing to protect the motor and to prevent the propulsor pinion gearhead from wear. Another purpose of the invention is to implement double motor power unit the size and design of which allows the power unit to be placed into the frame of the bicycle through the mounting hole of the bottom bracket, where the act of placement remains undetectable after placement.

The inventive step is based on the recognition that it is advantageous to insert an engine of small weight and with at least two motors, that cannot be seen from the outside, into the bicycle frame, so that the pinions with dynamometric system are also installed and the bearing can rotate freely on the axis. This recognition allows the double motor engine to quietly increase performance when necessary in certain situations, without almost any change to the weight of the bicycle, and the engine itself is also protected, as the installed pinion with dynamometric system provides the axis against breaking and the freely rotating bearing protects the motor and the propulsor pinion gearhead from wear, while the installed two motors provide significant extra performance.

According to the set purpose, the most general implementation form of the solution according to the invention can be implemented according to claim 1. The various implementation forms are described in the sub-claims. The procedure for placing the device into the bicycle frame in an advantageous manner is described in claim 5.

In general, the solution is a double motor power unit, suitably for being mounted onto a bicycle frame, which is fitted with at least two motors, at least one power supply, bearings, crank shaft pinion gearhead, at least one propulsor pinion gearhead for each motor, at least one planetary gearbox for each motor, and at least one central processor unit, where the crank shaft pinion gearhead is connected to a crank shaft through bearings, and the central processor unit is in wired or wireless connection with at least one motor through a switch. A characteristic feature of the invention is that the propulsor pinion gearheads are connected to pinions with dynamometric system, having an at least approximately identical axis, and to planetary gearboxes through the pinions, while the inside of the bearing is in fixed connection with the crank shaft and the outside of the bearing is in fixed connection with the pinion gearhead of the crank shaft.

Another implementation example is where it is placed into the seat tube or frame tube. Another characteristic feature may be that the pinions with dynamometric system have a spring, ball bearing, and round canal, and the pinions with dynamometric system are connected to the propulsor pinion gearheads through the balls bearing located in the round canal.

Another different implementation form may be that the power source is placed into the bicycle frame or onto the outside of the bicycle.

In the course of the procedure for placing the invention in general, advantageously into the bicycle frame, the double motor power unit is placed into the seat tube and the frame tube, and placement is carried out through the mounting hole of the bottom bracket by the end of the frame tube and seat tube.

BRIEF DESCRIPTION OF DRAWINGS

The invention is presented in more detail using implementation examples, drawings below. On the attached drawings.

DETAILED DESCRIPTION OF INVENTION

Figure 1:
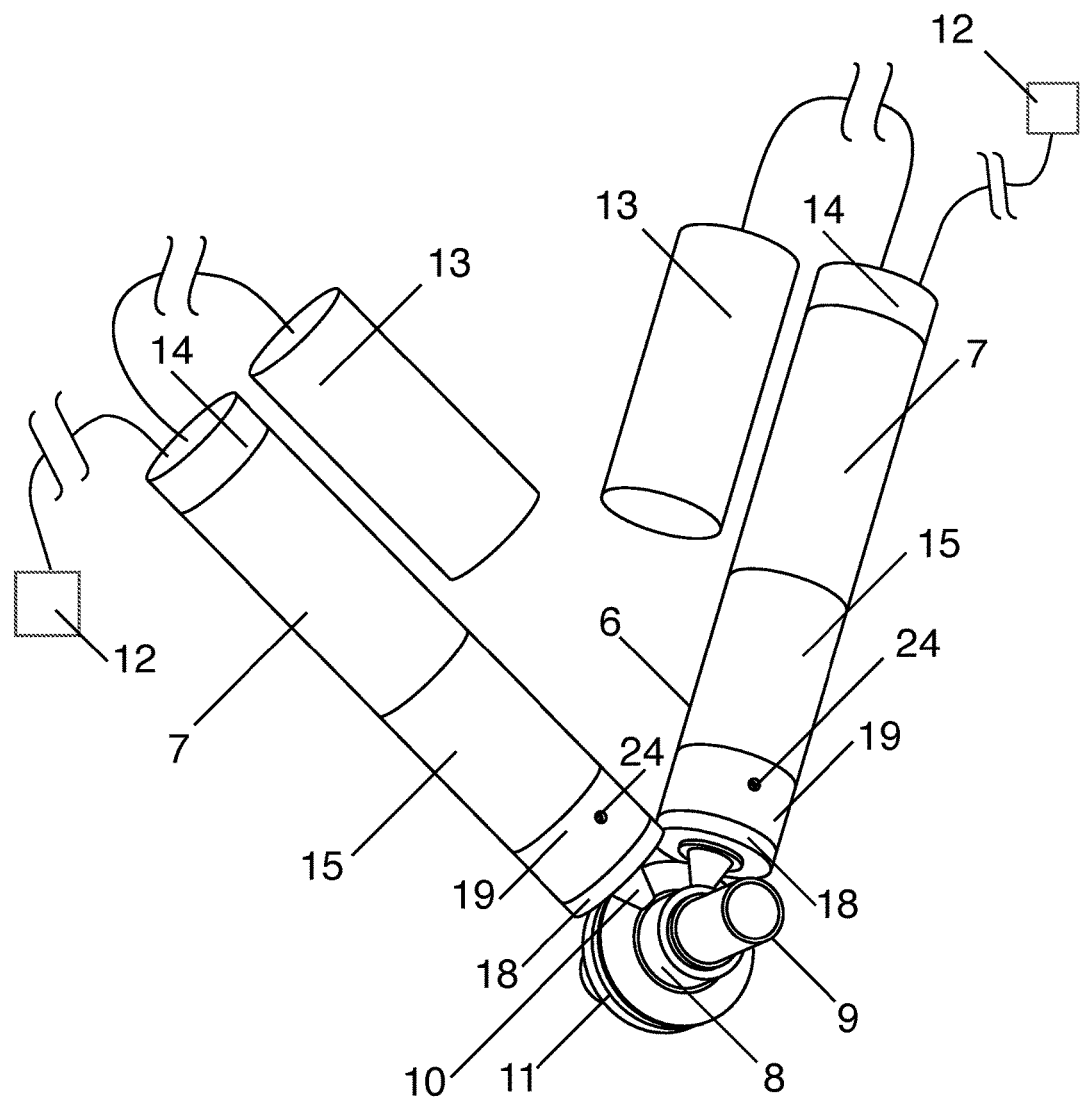
FIG. 1 shows an axonometric drawing of the double motor power unit.

FIG. 1 shows a spatial view of the double motor power unit 6. In addition to the motors, all necessary parts are double actually, so that the device could deliver double performance. The two parts of the double motor power unit 6 are inserted from below into two different tubes of the bicycle frame. The double motor power unit 6 has at least two motors 7 and a power supply 13 for each motor 7. The power supply 13 may be, among others, a battery that produces power required for running the motor 7. The power supply 13 is connected to the motor 7 but may be placed almost anywhere. A motor controller 14 is also connected to each motor 7, which can be controlled by central processor units 12. The central processor units 12 are in wired or wireless connection with the double motor power unit 6. It is also possible to have only one central processor unit 12 that controls the motor controller 14 of both motors 7 simultaneously. The operation of the two motors 7 is always synchronized. The central processor unit 12 can be anything that can start up the motor 7, such as a button, a heart rate meter, rotation meter, or speed meter. Even a smart phone application could be used to this end. In case of receiving a given impulse—too high heart rate, upcoming hill, button pressed by the user—, the central processor units 12 start up the two motors 7 through the motor controllers 14, which will support the driving of the crank shaft 9. This can supplement human force with significant extra performance. The motors 7 do not need to work continuously, they provide help only in certain necessary sections. Each motor 7 of the double motor power unit 6 is accompanied by a pinion with dynamometric system 19 and a propulsor pinion gearhead 10. In this case, the two propulsor pinion gearheads 10 are in cogwheel connection with the crank shaft pinion gearheads 11. Through the connection, the motors 7 together drive the crank shaft pinion gearhead 11, thereby driving the crank shaft 9 as well, through the planetary gearboxes 15, the pinions with dynamometric system 19, and the propulsor pinion gearheads 10. The crank shaft pinion gearhead 11 is connected to the crank shaft 9 through bearings 8. The internal part of the bearings 8 is in fix connection with the crank shaft 9 and the outside part is in fix connection with the crank shaft pinion gearheads 11. Such installation of the freely running bearings 8 into the double motor power unit 6 ensures that no resistance appears and no connection with the double motor power unit 6 is made when the crank shaft 9 is driven by human force. This provides protection against quick tear and wear. This is one of the main features of the device, i.e. when the user is simply working the pedals, the motor 7 and the propulsor pinion gearhead 10 does not have any connection with the crank shaft 9 on either side, so they are not subject to tear and wear. One of the novelties of the device, i.e. the pinion with dynamometric system 19 is located between the planetary gearbox 15 and the propulsor pinion gearhead 10. The axis of the pinion with dynamometric system 19 and of the propulsor pinion gearhead 10 is the same and is secured by fixing bearings 18 on both sides. The pinion with dynamometric system 19 ensures that the double motor power unit 6 does not break down when the motors 7 would drive the crank shaft 9, but the movement of the crank shaft 9 is prevented. The prevention of the crank shaft 9 due to an accident or the interruption of driving by human force results in great and unexpected momentum on the device, which may cause damage and injury. The flexibility of the pinion with dynamometric system 19 may be set through the mounting holes 24.

Figure 2:
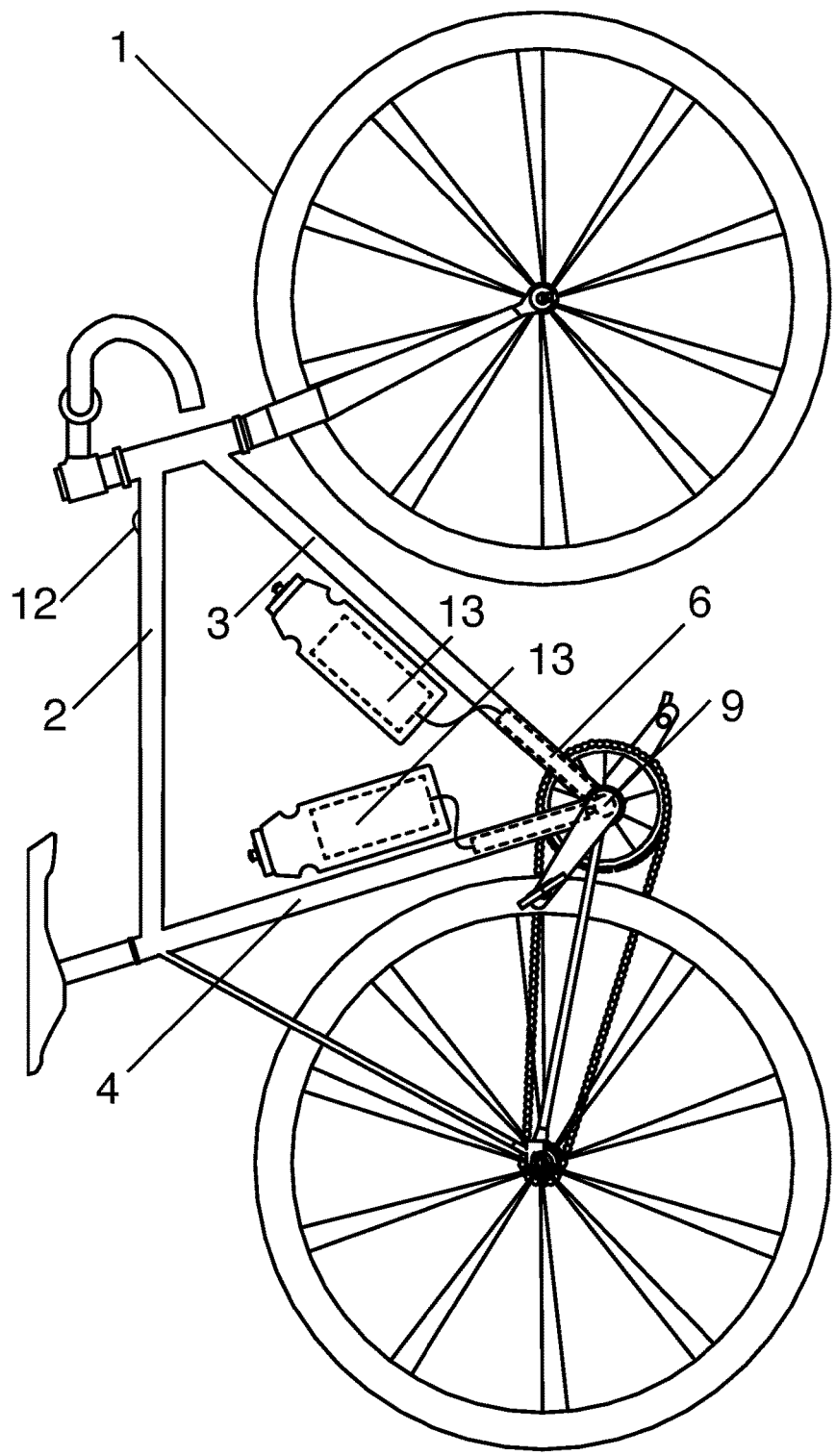
FIG. 2 shows a side-view of the bicycle and presents the location of the invention.
Figure 3:
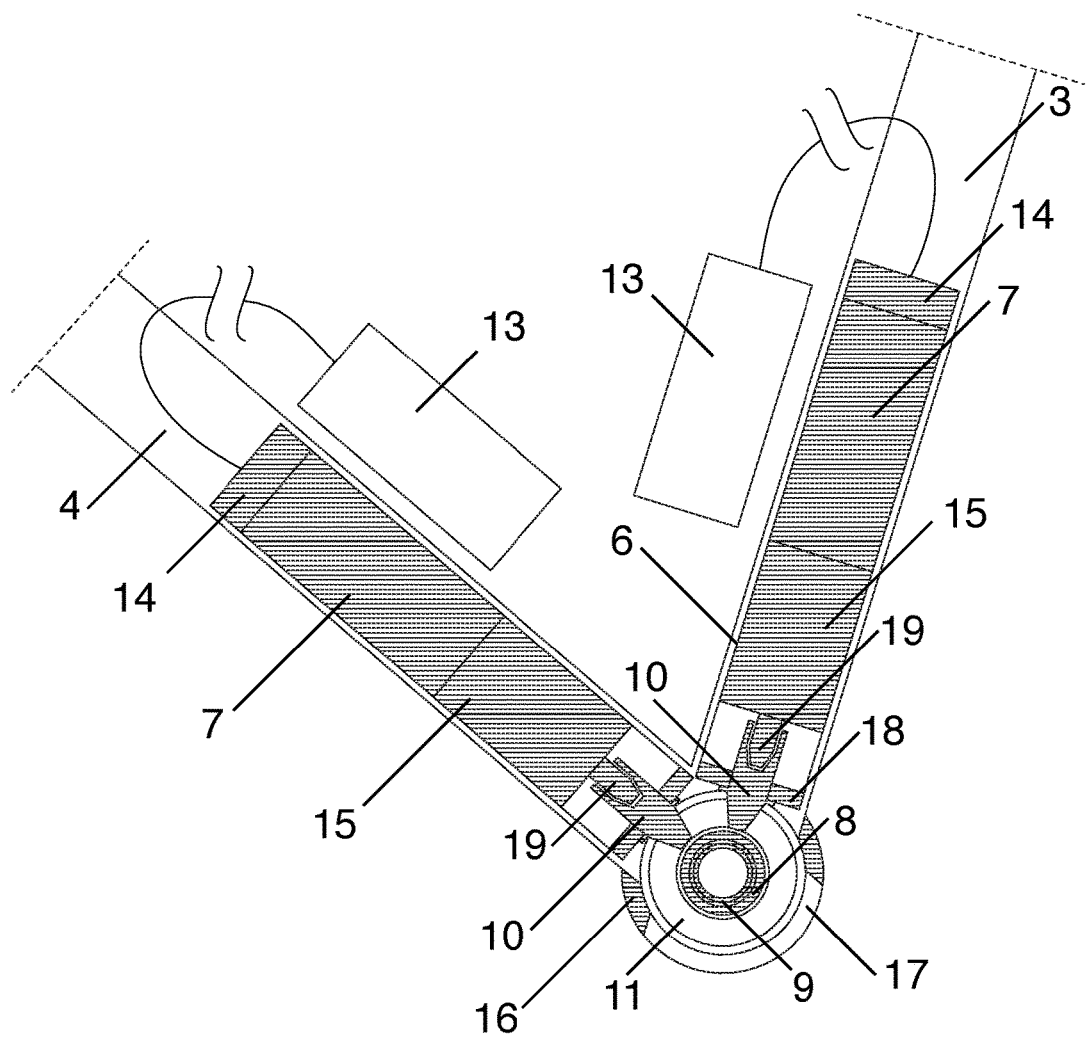
FIG. 3 shows a longitudinal cross-section of the double engine motor power unit.

FIG. 2 shows the side-view of an average bicycle 1 fitted with a double motor power unit 6 so that it cannot be seen from the outside. Thus, the use of the device may be kept quiet, if needed. The main components of the frame 2 of the bicycle 1 are the tilted frame tube 3 and the seat tube 4. The double motor power unit 6 is placed into these tubes, the tilted frame tube 3 and seat tube 4, from below, from the direction of the crank shaft 9. The double motor power unit 6 may have even more motors, in which case other parts of the frame 2 may be used as well. In this implementation form, the power supplies 13 that generate power are mounted onto the frame tube 3 and the seat tube 4 in an unassuming manner, hidden in the flask. Of course, the power supplies 13 can be mounted onto other parts of the bicycle 1, in the frame 2, or even onto the user. It is important that each motor has a power supply 13. The figure also shows the central processor unit 12, which, in this case, is a simple button. The central processor unit 12 is in wired or wireless connection with the double motor power unit 6 and indicates the commencement and end of operation. In addition to a button, it may be composed of a mileage meter, mobile phone, rotation meter, or heart rate meter as well. There might be one central processor unit 12 that starts up the entire double motor power unit 6 at the same time, but two or more central processor units 12 may be installed as well. FIG. 3 shows a cross-section of the crank shaft 9, where the double motor power unit 6 is placed into the frame tube 3 and the seat tube 4. The figure provides a thorough description of the operation of the double motor power unit 6. The design and size of the double motor power unit 6 makes it fit for being installed into the frame tubes 3, 4 of any bicycle without being visible and without any significant change to the bicycle frame. Installation is carried out through the mounting hole 17 of the bottom bracket 16 of the frame tube 3 and seat tube 4. The parts of the double motor power unit 6 include the motors 7, the respective motor controllers 14, and the power supplies 13 providing power. The operation of the motors 7 is dependent on the capacity of the power supplies 13. The power supplies 13 can be batteries, for example, that can be mounted onto the bicycle or in the frame as needed. The cogwheels, the crank shaft pinion gearhead 11 and the driving propulsor pinion gearheads 10 play primary role in driving. The crank shaft pinion gearhead 11 is connected to the crank shaft 9 through bearings 8. The propulsor pinion gearheads 10 drive the crank shaft pinion gearhead 11 through the motors 7, the planetary gearboxes 15, and the pinion with dynamometric systems 19. The pinion with dynamometric system 19 that is the primary protector is located between the planetary gearbox 15 and the propulsor pinion gearhead 10. The axis of the pinion with dynamometric system 19 and of the propulsor pinion gearhead 10 is the same, as secured by the fixing bearings 18.

Figure 4:
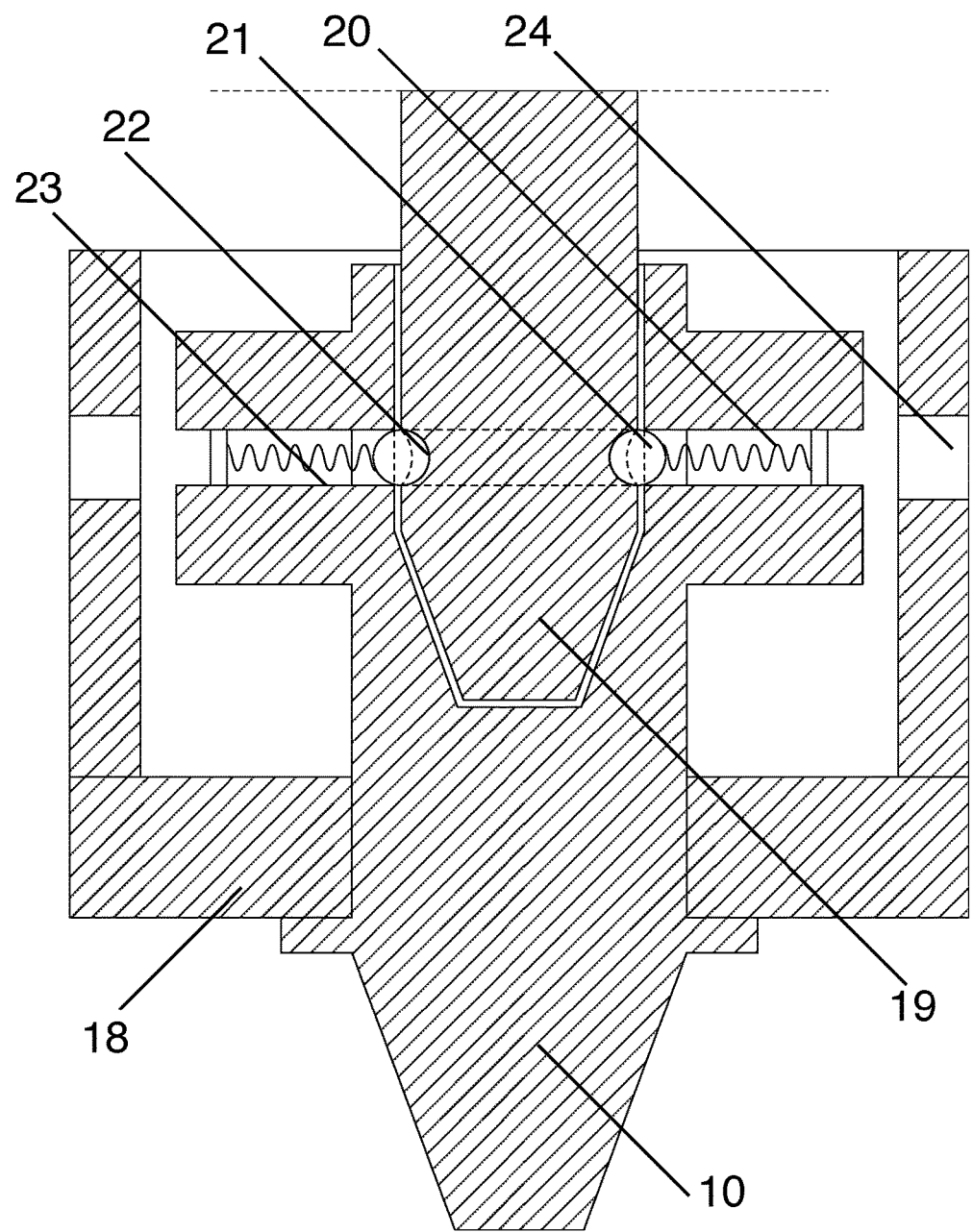
FIG. 4 shows the longitudinal cross-section of the pinion with dynamometric system.

FIG. 4 shows the pinion with dynamometric system 19 in more detail. The most general implementation form of the invention includes two pinions with dynamometric system 19. The pinion with dynamometric system 19 is connected to the propulsor pinion gearhead 10 through ball bearings 21. The pinion with dynamometric system 19 and the propulsor pinion gearhead 10 have the same axis, this is ensured by fixing bearings 18. The pinion with dynamometric system 19 can be driven in both directions, which makes the operation of the motor unit absolutely silent and quiet. When driving backward unexpectedly, the pinion with dynamometric system 19 prevents any damage to the propulsor pinion gearhead 10. The interruption of driving the bicycle by human force results in great and unexpected momentum on the device, which may cause damage to the propulsor pinion gearhead 10. The pinion with dynamometric system 19 protects the propulsor pinion gearhead 10 against the harmful impact of the momentum like a torque wrench. A round canal 22 and volutions 23 are implemented in the pinion with dynamometric system 19, so that ball bearings 21 are located in the volutions 23 in the round canal 22, pressed down by a spring 20. The route of the spring 20 can be regulated and adjusted through the mounting hole 24. If any strike or load reaches the pre-set value, the ball bearing 21 pressed down by the spring 20 can move in the round canal 22 to the next volution 23, thereby reducing the pressure on the pinion with dynamometric system 19.

The presented devices have numerous advantages. The power unit is an invention that can be used for riding bicycles and can be built into a bicycle frame. The power unit can be used to supplement bicycles used for hobby and tourism related purposes in order to make uphill riding less exhausting and to facilitate longer trips. The power unit according to the invention has double motors, thus quasi consisting of two, almost identical power unit systems. The two motors drive the crank shaft pinion gearhead with double momentum and double performance. Another important advantage of the invention is that the user makes use of the support when it is actually needed, instead of using it all the time, as in the case of inventions belonging to the state of the art. Another advantage of the solution is that it is absolutely undetectable from the outside, meaning that it is quiet and the bicycle can be transported easily due to its small weight. It can be fitted into a car or placed on a roof rack easily. Another important advantage is that the bicycle will remain easy to manoeuvre due to the support provided to the pedal axis. Another advantage of the invention is that the motor does not keep rotating the axis when it is not driven by human force, due to the installed pinion with dynamometric system. This also makes the support undetectable. The device also keeps the motor free from damage in case of an accident, when the crank shaft stops unexpectedly due to any hindrance to the pedals. This also protects the crank shaft from breaking under the powerful force. The system that can also be driven backward makes the operation of the device even more silent. This is achieved so that the pinion with dynamometric system prevents the propulsor pinion gearhead from damages when driving backward unexpectedly. The interruption of driving the bicycle by human force results in great and unexpected momentum on the device, which may cause damage to the gearheads. The pinion with dynamometric system protects the gearheads against the harmful impact of the momentum, like a torque wrench. A round canal and volutions are implemented in the pinion with dynamometric system, so that ball bearings are located in each round canal, pressed down by a spring. If any strike or load reaches the pre-set value, the ball bearing pressed down by the spring can move in the round canal to the next volution, thereby reducing the pressure on the pinion with dynamometric system. Due to its geometry, the double motor power unit can be driven backward and, when switched off, the bicycle can be driven by foot without friction or rotation by the cogwheels, thereby making the power unit undetectable. If the user starts driving the pedals backward unexpectedly, the pinion with dynamometric system prevents any damage to the propulsor pinion gearhead. After installing the device according to the invention, the weight of the bicycle may be kept below 8.5 kg. Due to the low position of the centre of gravity, the user does not even notice that he is riding a bicycle with electric support. When the support is not turned on, the bicycle is a normal bicycle just like any other bicycle. Fitting the power unit according to the invention enables tired, less trained, or even older or ill people to do sports activities under more difficult circumstances and to complete longer distances and uphill rides. The invention enables efficient movement with a bicycle without any lactic acid being produced in the muscles, without the heart rate going to high, so that human power and the momentum of the power unit, as well as the ratio of these two factors can be regulated, thereby enabling the rehabilitation of injured people. This provides the users with an excellent opportunity, as the user of a bicycle fitted with such a device can travel to places and can ride longer distances by combining his own power and the assistance of the power unit, without losing the fun of doing sports, that cannot be matched by using other bicycles, rollers, or similar items that are not equipped with the power unit according to the invention. It is also advantageous that the bicycles can be personalized. For example, it can be set when the power unit should switch on and from what time the motor should provide assistance. The central processor unit of the device can be a simple button, a knob, a mileage meter, a mobile phone, a rotation meter, or even a heart rate meter. For example, it can be set that the motor turns on when the heart rate is high and keeps providing assistance until the heart rate drops below a desired threshold. It is a very important advantage that the power unit according to the description can be fitted into any bicycle frame, due to the design of the house of the unit. This advantage—i.e. that no changes to the bicycle frame are required as the invention can be fitted into almost any existing bicycle frame—is also ensured by the fact that the power unit can be fitted into a vertical seat tube or a tilted frame tube. For example and among others, the one part of the power unit may be installed in the seat tube and the other part may be installed in the tilted frame tube. Thus, the power unit increases the performance/weight ratio of the bicycle and biker while the power unit remains undetectable and silent and the weight of the bicycle barely increases, without any impairment to traditional usability and appearance of the bicycle. It is also an important advantage that the power source for the unit can be placed anywhere on the bicycle or the user, even in the flask or inside the bicycle frame if discretion is necessary. The power source can be a battery or any other unit that produces and/or stores electricity that is suitable for the purpose. The capacity of the power source can be personalized, and batteries with larger capacity can run the motor for longer periods. The novelty and an important advantage of the solution is that no resistance is provided and the cogwheels and the motor is protected against damage and wear when no support is provided, due to the bearing that runs freely on the crank shaft.

In addition to the above examples, the invention can be implemented in other forms and with other manufacturing procedures within the scope of protection.

The invention claimed is:

1. Double motor power unit, suitably for being mounted onto a bicycle frame, which is fitted with at least two motors (7), at least one power supply (13), bearings (8), crank shaft pinion gearhead (11), at least one propulsor pinion gearhead (10) for each motor, at least one planetary gearbox (15) for each motor, and at least one central processor unit (12), where the crank shaft pinion gearhead (11) is connected to a crank shaft (9) through bearings (8), each of the at least two motors (7) are connected to the at least one power supply (13) and the central processor unit (12) is in wired or wireless connection with at least one motor (7) through a switch (14), characterized in that the propulsor pinion gearheads (10) are connected to pinions with dynamometric system (19), having an at least approximately identical axis, and to planetary gearboxes (15) through the pinions, while the inside of the bearings (8) is in fixed connection with the crank shaft (9) and the outside of the bearings (8) is in fixed connection with the crank shaft pinion gearhead (11).

2. The unit according to claim 1, characterized in that the double motor power unit is placed into a seat tube (4) and a frame tube (3).

3. The unit according to claim 1, characterized in that the pinions with dynamometric system (19) are fitted with a spring (20), ball bearing (21), round canal (22), and volution (23), and the pinions with dynamometric system (19) are connected to the propulsor pinion gearhead (10) through the ball bearing (21) located in the round canal (22).

4. The unit according to claim 1, characterized in that the power supply (13) is located inside the frame (2) or on the outside of the bicycle (1).

5. Procedure for placing the power unit according to claim 1 suitably into the bicycle frame, characterized in that the double motor power unit (6) is placed into a seat tube (4) and a frame tube (3), so that placement is carried out through a mounting hole (17) of bottom bracket (16) on the end of the frame tube (3) and seat tube (4) by the bottom bracket (16).

* * * * *